Feb. 10, 1970  H. J. KING ET AL  3,494,287
GRAVITY INDEPENDENT LIQUID FLOW CONTROLLER
Filed Nov. 30, 1967
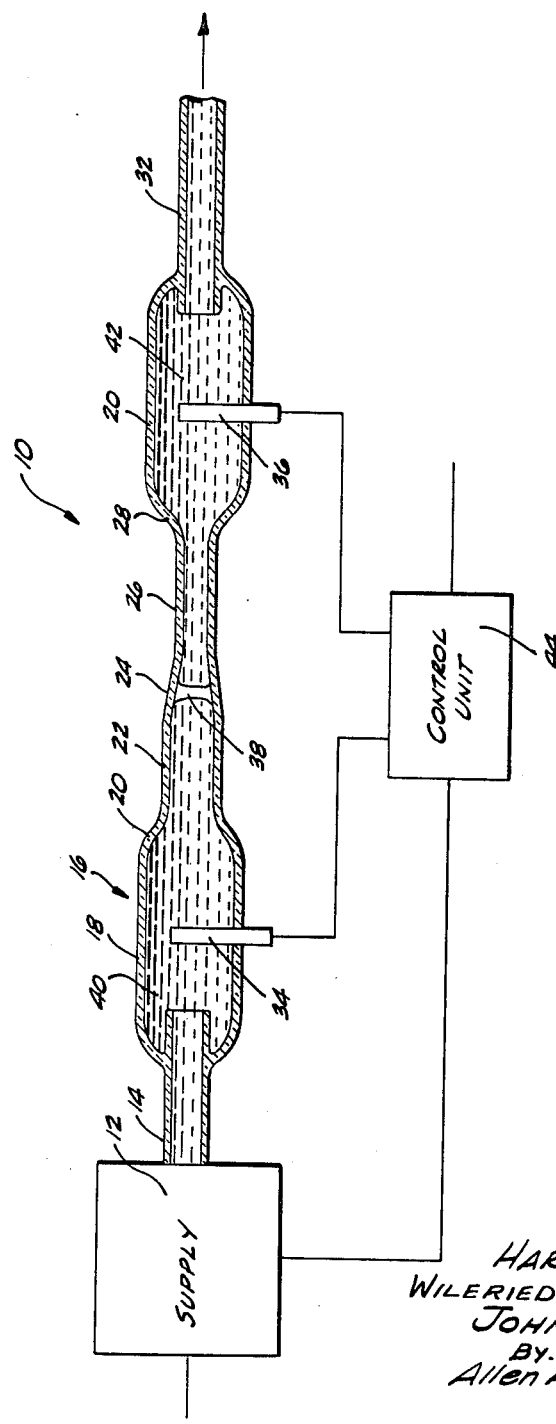
INVENTORS.
HARRY J. KING,
WILFRIED O. ECKHARDT,
JOHN A. SNYDER,
BY.
Allen A. Dicke Jr.,
AGENT.

United States Patent Office 3,494,287
Patented Feb. 10, 1970

3,494,287
GRAVITY INDEPENDENT LIQUID FLOW
CONTROLLER
Harry J. King, Canoga Park, Wilfried O. Eckhardt,
Malibu, and John A. Snyder, Woodland Hills,
Calif., assignors to Hughes Aircraft Company,
Culver City, Calif., a corporation of Delaware
Filed Nov. 30, 1967, Ser. No. 687,021
Int. Cl. F04b 19/00; G01r 27/22
U.S. Cl. 103—1                              10 Claims

ABSTRACT OF THE DISCLOSURE

Electrolyzable liquid which is to have its flow controlled is separated in an insulative conical feed line by means of an electrolyte which is immiscible with the electrolyzable liquid and which preferentially wets the sides of the feed line. The liquid flow rate is established by providing electrolyzing current across the electrolyte bubble to electrolyze the liquid across the bubble at the desired rate of flow. Controllable means to deliver the liquid to the feed line is provided. The voltage drop across the bubble is measured and is used to control the liquid delivery means. At constant electrolysis current, the voltage drop across the bubble is a function of the area of the interface between the liquid and the electrolyte. Since the electrolyte is positioned in a conical portion of the feed line, the voltage drop across the bubble is position dependent and thus is a function of the amount of liquid delivered to the feed line. This voltage drop signal is used to control the controllable supply means so that the bubble stays in a substantially constant position within the conical portion of the feed line so that the amount of electrolyzable liquid delivered by the feed line is proportional to the electrolysis current.

CROSS REFERENCE

This invention is related to the inventions of patent application Ser. No. 687,004, filed Nov. 30, 1967, entitled "Liquid Mercury Flow Control and Measuring System," inventor: W. O. Eckhardt; and patent application Ser. No. 687,020, filed Nov. 30, 1967, entitled "Metering System for Liquid Mercury," inventor: Harry J. King.

BACKGROUND

The liquid flow control system includes a controllable source of the liquid and flow detection means for detecting the deviation of flow of delivered liquid from the desired rate. The system is especially applicable to those needs wherein the desired rate of flow is very low.

The controlled delivery of liquid has received a considerable amount of attention. There are many valves and controllable pumps which are intended for the accurate delivery rate of a liquid. Many of these prior devices and systems are very satisfactory when used in the environment and in the rate ranges for which they were originally intended. However, little work has been done and little equipment is available for the delivery of liquids at a very low rate. When delivery of liquid at the rate of in the order of milligrams per hour is desired, most of the present devices are incapable of such delivery rates because the internal leakages far exceed the desired flow rate.

SUMMARY

The liquid flow control device of this invention is particularly suited for the control of delivery of an electrolyzable liquid at very low flow rates. It principally comprises a controllable source of the liquid, which delivers liquid to a flow rate detecting feed line. This feed line has an insulative conical section in which is located an electrolyte bubble. The electrolyte bubble preferentially wets the feed line surface to separate the delivered liquid into separate columns. The liquid is electrolyzed across the electrolyte at the desired rate by means of electric current appropriate for that flow rate. In the desired case of constant flow rate, this current is constant. The voltage drop across the electrolyte bubble, due to the interface areas between the electrolyte bubble and the separated liquid columns is a function of the cross sectional area of the bubble and this is related to the bubble position within the conical section of the column. The voltage drop is used to control the controllable source of the liquid.

Accordingly, it is an object of this invention to provide a liquid flow control in which the position of an electrolyte bubble is related to the deviation of the actual flow rate from the desired flow rate, and the position deviation is electrically signaled by means of the voltage drop across the electrolyte to signal correction of flow rate to maintain the desired flow rate. It is another object of this invention to employ a flow detection means wherein a conical feed line having an electrolyte bubble therein signals corrections in flow rate. It is another object of this invention to provide an electrolyte within a conical feed line wherein the electrolyte preferentially wets the feed line as compared to the pumped liquid so that the bubble is maintained in contact with the feed line surface. Other objects and advantages of this invention will become apparent from the study of the following portion of this specification, the claims and the attached drawing.

DESCRIPTION OF THE DRAWING

The single figure of the drawing is a longitudinal section through the flow rate controlling feed line of the liquid flow controller of this invention, together with a schematic diagram of the associated electrical circuitry and of the controllable source of liquid.

DESCRIPTION

The liquid flow controller of this invention is generally indicated at 10 in the single figure of the drawing. A controllable supply of electrolyzable liquid under pressure is indicated at 12. The supply means for the liquid under pressure can be any conventional supply means. It may be a pressurized vessel with pressure control or with a controllable needle valve output. It may be a mechanical pump of controllable volume, or with a liquid by-pass. In any event, the supply means is conventional and the only requirement thereof is that it supplies the electrolyzable liquid under pressure in an amount that can be controlled by an external signal.

Supply means 12 is connected to deliver electrolyzable liquid under pressure to inlet nozzle 14 of feed line 16. Inlet nozzle 14 is connected to trap 18 and extends into the trap. The trap is provided to prevent electrolyte from escaping from the feed line and the extension of the feed line into the trap provides this function. Trap 18 is connected to retention section 20 which is conical in form. Retention section 20 also acts as a means for retaining the electrolyte in the manner hereinafter described.

Retention section 20 is connected to large tube 22, which in turn is connected to conical control section 24. The down-stream end of conical control section 24 is in turn connected to small tube 26. Small tube 26 is followed by retention section 28 and that is followed by trap 30. Outlet nozzle 32 extends into trap 30 to form a reentrant nozzle therein and has an outlet end which is connectable to any equipment requiring the accurately controlled flow of an electrolyzable liquid.

Electrodes 34 and 36 are positioned in feed line 16. They are spaced apart on opposite sides of conical control section 24, and are preferably located respectively in traps 18 and 30. Electrodes 34 and 36 are connected to control unit 44, which in turn is connected to control the flow rate output of supply means 12 into inlet nozzle 14. At least the conical control section 24 is of electrically insulative material to electrically separate the electrodes 34 and 36, as far as feed line 16 is concerned. However, preferably the insulative section extends at least from the juncture between trap 18 and retention section 22, and the juncture between retention section 28 and trap 30. As is later explained, these are the limits at which the electrolyte bubble can extend across the feed line, and thus they are limits of electrolyte bubble position for electrolysis.

Electrolyte bubble 38 is normally positioned in conical control section 24, as is shown in the figure. In this position the electrolyte bubble separates the electrolyzable liquid which fills the remainder of feed line 16 and divides it into pumped column 40 and measured column 42. For purposes of illustration, mercury is the liquid of which the flow is controlled. One of the critical elements of this invention, necessary for the proper operation is that the interior of feed line 16 must be preferentially wet by the electrolyte, so the electrolyzable liquid cannot form a short circuit in the control section around the electrolyte. In the illustrative case of mercury, glass serves as a suitable material for feed line 16.

A number of different electrolytes can be used to form electrolyte bubble 38. In the specific example, the electrolyte must be capable of electrolyzing mercury, it must wet the interior surface of feed line 16 to prevent a short circuit of mercury along the feed line. Different electrolytes have different electrolytic capabilities before they break down due to excess current. Thus, the electrolyte may be chosen with the desired mercury flow rate in mind. A suitable electrolyte is mercury iodide in iodide solution. The table below illustrates a practical electrolyte for use with mercury.

| | | |
|---|---|---|
| KI | grams | 750 |
| HgI | do | 225 |
| $H_2O$ | cc | 1000 |

The preferred electrolyte listed in the table above is capable of .5 amperes per sq. cm. without breakdown. In the specific example of the controlled pumping of liquid mercury, it is assumed that $5 \times 10^{-4}$ amperes of electrolysis current is applied. This is suitable current for a bore of 0.01 sq. cm. in small tube 26. The applicable formula is:

$$\text{Mass transported} = \frac{(\text{molar mass}) \times (\text{current}) \times (\text{time of current flow})}{(\text{Faraday's constant}) \times (\text{valence})}$$

Using the above assumptions and the data for mercury, the amount of mercury delivered in one hour is:

$$\text{Mass transported} = \frac{(200 \text{ grams/mol}) \times (5 \times 10^{-4} \text{ amps.}) \times (3600 \text{ sec.})}{(96487 \text{ amp. sec./mol}) \times 2}$$

$$= 1.87 \text{ milligrams}$$

Thus, the delivery rate in the illustrative example is 1.87 milligrams per hour of mercury. This rate is independent of tube diameter and dependent only upon the current flow.

With such extremely low feed rates of electrolyzable liquids, such as mercury, the equipment presently available on the open market has been incapable of proper operation. Leakages in the equipment, particularly past valves and piston seals exceeds the desired flow rate to make control of the flow very difficult. An example of equipment which requires such flow rates is found in copending application Ser. No. 476,810, filed Aug. 3, 1965, which discloses a cathode which requires a liquid mercury supply. Only enough liquid mercury is delivered to the cathode to provide the material for a plasma arc. In such cathodes, excess mercury will evaporate into the vacuum to provide an undesirably high neutral to electron ratio. On the other hand, insufficient mercury supply to the cathode results in starvation of the arc and its extinguishment. Thus, proper mercury flow rate is essential for the proper operation of the device. The liquid flow control of this invention is capable of meeting the mercury supply requirements of such a cathode.

In accordance with the above description, it is clear that the amount of mercury fed by electrolysis across the electrolyte is a direct function of the current. Thus, the control unit 44 provides the current required for the desired feed rate. Assuming that the desired feed rate is constant, the current flow between electrodes 34 and 36, and through electrolyte bubble 38 is constant. However, if supply means 12 provides more or less liquid flow than this desired constant flow rate, the electrolyte bubble 38 shifts axially in conical control section 24. In such electrolysis, the voltage across the mercury column gap provided by the electrolyte bubble, at constant current, is a strong function of the cross sectional area. Since this control section is conical, the voltage drop between electrodes is thus a function of the axial position of the bubble. When the flow rate into inlet nozzle 14 varies from the flow rate defined by the electrolysis current, the electrolyte bubble will shift up stream or down stream, and the deviation of the voltage across the electrodes from its value when the electrolyte bubble is centered is a measure of the electrolyte bubble position.

The difference between the actual voltage drop and that corresponding to the centered position is used as the error signal which controls the flow out of supply means 12. This error signal corrects the flow rate so that the electrolyte bubble 38 is returned to the center position in the conical section 24. If the bubble is shifted to either one of the extreme positions by a gross discrepancy between the liquid flow rate produced by supply means 12 and the intended flow rate as determined by the impressed electrolysis current, the maximum error signal will be maintained even if the discrepancy persists, for the electrolyte bubble 38 can move for some distance along either of the tubular sections 22 or 26 without changing cross section. Preferably, these tubular sections 22 and 26 are cylindrical tubes and the conical control section 24 is a truncated right cylindrical cone. Large tube 22 and small tube 26 are made long enough to accommodate the normal response time of the control loop.

Should the intended flow rate not be reestablished for some reason, when the electrolyte bubble reaches either of the retention sections 20 or 28, escape of the electrolyte is prevented by these retention sections. The operation is based on the fact that a liquid bubble which wets the tube walls cannot be expanded to arbitrary diameters when bounded by a liquid which does not wet the tube walls. Instead, in order to maximize its attachment area to the wettable wall, the bubble will jump into an asymmetric or annular position when it is pushed into a cross section of the feed line 16 of such diameter that the asymmetric or annular position results in a smaller value of the surface energy. This results in contact between the two mercury columns 40 and 42 with the resultant electrical short. However, since an even smaller surface energy is available to the electrolyte bubble in the symmetric position at a smaller diameter, the asymmetric or annular bubble will subsequently creep back into the adjacent tube 22 or 26 and will reform a gap between the mercury columns.

If, for some reason, the electrolyte bubble escapes either of the retention sections 20 or 28, the traps 18 or 30 will positively trap the electrolyte within the flow meter. The surface energy argument shows that the electrolyte bubble cannot enter the reentrant nozzle sections of nozzles 14 and 32 where they extend into the traps.

It is seen that the liquid flow control of this invention provides the desired flow rate across the electrolyte bubble and provides a signal which shows bubble position so that the supply means of the liquid can be controlled to provide an accurate output of the pumped liquid.

The specific materials described above include a liquid metal, mercury, as the electrolyzable liquid. However, other electrolyzable liquids can be involved in mass transfer across the gap formed by the electrolyte bubble. The requirements of the general system are that the electrolyzable liquid and the electrolyte be immiscible, that the electrolyte preferentially wets the walls of the tube, and, of course, that the system is capable of mass transfer by electrolysis. Thus, the electrolyte is not restricted to an aqueous solution.

This invention having been described in its preferred embodiment, it is clear that is is susceptible to numerous modifications and embodiments within the ability of those skilled in the art and without the exercise of the inventive facility.

What is claimed is:

1. A liquid flow controller, said liquid flow controller comprising:
   a feed line, first and second spaced electrodes in said feed line, said feed line being electrically insulative between said electrodes, the improvement comprising:
   a control section in said feed line between said electrodes, said control section being of larger cross section toward said first electrode than toward said second electrode, said feed line being arranged to receive a column of electrolyzable liquid and a bubble of electrolyte, with the bubble of electrolyte positioned in said control section, so that the interface area between the electrolyzable liquid and the electrolyte bubble is uniquely dependent on electrolyte bubble position and the inter-electrode resistance is dependent on electrolyte bubble position so feed line flow can be controlled from inter-electrode resistance.

2. The liquid flow controller of claim 1 wherein at least a portion of said feed line between said electrodes is made of material which is not wet by the electrolyzable liquid and is wet by the electrolyte bubble.

3. A liquid flow controller, said liquid flow controller comprising:
   a feed line, first and second spaced electrodes in said feed line, said feed line being electrically insulative between said electrodes, the improvement comprising:
   a control section in said feed line between said electrodes, said control section being wettable by the electrolyte and not wettable by the electrolyzable liquid, said control section being of uniformly decreasing cross section from its end towards said first electrode to its end toward said second electrode;
   said feed line being arranged to receive a column of electrolyzable liquid and a bubble of electrolyte, with the bubble of electrolyte positioned in said control section, so that the interface area between the electrolyzable liquid and the electrolyte bubble is dependent on electrolyte bubble position.

4. The liquid flow controller of claim 3 wherein said control section is formed as a truncated right circular cone.

5. A liquid flow controller, said liquid flow controller comprising:
   a feed line, first and second spaced electrodes in said feed line, said feed line being electrically insulative between said electrodes, the improvement comprising:
   a control section in said feed line between said electrodes, said control section being formed as a truncated right circular cone and a cylindrical tube being formed in said feed line on each end of said control section, said tube toward said first electrode being a large tube, and said tube toward said second electrode being a small tube, said feed line being arranged to receive a column of electrolyzable liquid and a bubble of electrolyte, with the bubble of electrolyte positioned in said control section so that the interface area between the electrolyzable liquid and the electrolyte bubble is dependent upon electrolyte bubble position, said large tube, said small tube and said control section being formed of material which is wet by the electrolyte and which is not wet by the electrolyzable liquid, the material of said large tube, said small tube and said control section being formed of electrically insulative material.

6. The liquid flow controller of claim 5 wherein a first retention section is formed in said feed line between said large tube and said first electrode, and a second retention section is formed in said feed line between said small tube and between said second electrode, said retention sections having increasing cross section toward said electrodes.

7. The liquid flow controller of claim 6 wherein a first trap is positioned in said feed line between said first retention section and said first electrode, said first trap having a larger cross section than said larger tube, and a second trap is positioned in said feed line between said second retention section and said second electrode, said second trap having a larger cross section than said large tube, an inlet nozzle connected to said first trap and an outlet nozzle connected to said second trap for the passage of electrolyzable liquid from said inlet nozzle through said feed line and out said outlet nozzle.

8. The liquid flow controller of claim 7 wherein a controllable source of electrolyzable liquid is connected to said inlet nozzle and a control unit is connected to said first and second electrodes and to said controllable source, said control unit providing electrolysis current between said electrodes to electrolyze electrolyzable liquid across the electrolyte bubble and said control unit measuring the voltage drop between said first and second electrodes and controlling the output of said controllable source of electrolyzable liquid in accordance with the voltage drop.

9. The process of controlling the flow of electrolyzable liquid comprising the steps of:
   providing a feed line having first and second electrodes and having a control section between the electrodes having a varying cross sectional area;
   positioning a bubble of electrolyte in the control section;
   electrolyzing liquid across the electrolyte bubble by passing current between the first and second electrodes;
   detecting the voltage drop between the first and second electrodes; and
   controlling the input of electrolyzable liquid into the feed line in accordance with the voltage drop between the first and second electrodes.

10. The process of claim 9 wherein the electrolysis current is held substantially constant in accordance with a substantially constant flow requirement of electrolyzable liquid through the feed line.

References Cited

UNITED STATES PATENTS

| | | | |
|---|---|---|---|
| 2,770,590 | 11/1956 | Serduke | 103—1 |
| 3,249,724 | 5/1966 | Huruitz | 324—93 |
| 3,255,413 | 6/1966 | Marwell et al. | 324—94 |
| 3,427,539 | 11/1969 | Mann | 324—94 |

WILLIAM L. FREEH, Primary Examiner

U.S. Cl. X.R.

137—2; 324—94